United States Patent
Few et al.

(10) Patent No.: US 7,040,689 B2
(45) Date of Patent: May 9, 2006

(54) SLIDABLE ROOM ASSEMBLY AND METHOD OF INSTALLATION

(75) Inventors: Jeffrey P. Few, Elkhart, IN (US); Bernard F. Garceau, Vandalia, MI (US); Mark D. Howie, Edwardsburg, MI (US); James D. Smith, Jr., Cassopolis, MI (US)

(73) Assignee: Norco Industries, Inc., Compton, CA (US)

( * ) Notice: Subject to any disclaimer, the term of this patent is extended or adjusted under 35 U.S.C. 154(b) by 0 days.

(21) Appl. No.: 10/723,649

(22) Filed: Nov. 26, 2003

(65) Prior Publication Data

US 2004/0145204 A1 Jul. 29, 2004

Related U.S. Application Data

(63) Continuation-in-part of application No. 10/668,038, filed on Sep. 22, 2003, which is a continuation of application No. 10/002,032, filed on Nov. 15, 2001, now Pat. No. 6,623,066.

(51) Int. Cl.
*B60R 27/00* (2006.01)

(52) U.S. Cl. .................................... 296/165; 296/26.13

(58) Field of Classification Search ............. 296/26.13, 296/26.12, 26.08, 26.09, 26.04, 26.05, 165, 296/171, 172, 175; 52/67, 143
See application file for complete search history.

(56) References Cited

U.S. PATENT DOCUMENTS 1,972,415 A   9/1934   Anderson
2,739,833 A   3/1956   Schenkel et al.
2,744,781 A   5/1956   Black
2,857,197 A   10/1958  Hogg
2,877,509 A   3/1959   Klibanow
2,898,143 A   8/1959   Ferrera
2,898,144 A   8/1959   Ferrera
2,902,312 A   9/1959   Ferrera
2,987,342 A   6/1961   Meaker et al.
3,341,986 A   9/1967   Brosig
4,103,462 A   8/1978   Freller
4,270,791 A   6/1981   Tann
5,090,749 A   2/1992   Lee (Continued)

FOREIGN PATENT DOCUMENTS

BE            523151        10/1953

(Continued)

*Primary Examiner*—Joseph D. Pape
(74) *Attorney, Agent, or Firm*—Hahn Loeser & Parks LLP; Michael H. Minns

(57) ABSTRACT

A slidable room assembly comprises a vehicle body having an opening formed in an exterior wall, and a reciprocable slideout unit or compartment disposed in the opening and slidable between a retracted position and an extended position. Sliding movement of the slideout unit is controlled by a drive mechanism that includes two sets of cabling. The drive mechanism includes a frame installed about the opening in the vehicle body. The frame includes a header, a sill and two pre-assembled jambs. The pre-assembled jambs have a plurality of pulleys with a plurality of cables pre-installed inside the jambs around the pulleys. One end of the cables, attached to the slidable room, is pre-strung through a cable extension hole. The other end of the cables extends out an end of the jamb.

37 Claims, 17 Drawing Sheets

U.S. PATENT DOCUMENTS

| | | |
|---|---|---|
| 5,237,782 A | 8/1993 | Cooper |
| 5,248,180 A | 9/1993 | Hussaini |
| 5,295,430 A | 3/1994 | Dewald, Jr. et al. |
| 5,332,276 A | 7/1994 | Blodgett, Jr. |
| 5,634,683 A | 6/1997 | Young |
| 5,791,715 A | 8/1998 | Nebel |
| 5,800,002 A | 9/1998 | Tiedge et al. |
| 6,152,520 A | 11/2000 | Gardner |
| 6,254,171 B1 | 7/2001 | Young, Sr. |
| 6,536,821 B1 | 3/2003 | Gardner |
| 2002/0063441 A1 | 5/2002 | Young, Sr. |
| 2002/0089212 A1 | 7/2002 | Garceau et al. |

FOREIGN PATENT DOCUMENTS

| | | |
|---|---|---|
| CA | 2136673 | 3/1996 |
| DE | 1 095 137 B | 12/1960 |
| GB | 882258 | 11/1961 |

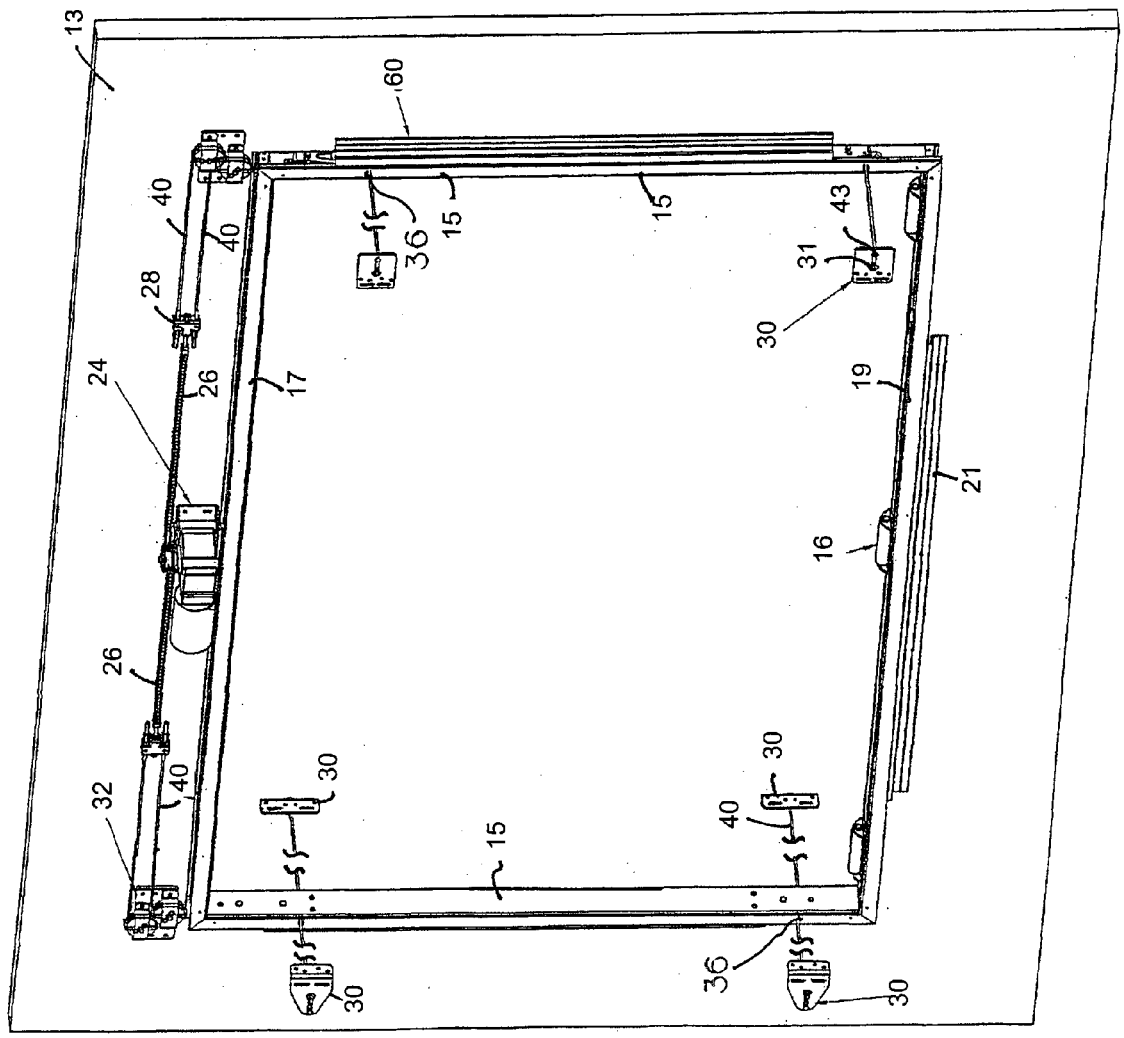

SLIDABLE ROOM ASSEMBLY AND METHOD OF INSTALLATION

This application is a continuation-in-part of prior application Ser. No. 10/668,038, filed Sep. 22, 2003, which was a continuation of prior application Ser. No. 10/002,032, filed Nov. 15, 2001, now U.S. Pat. No. 6,623,066. Application Ser. Nos. 10/668,038 and 10/002,032 are hereby incorporated by reference.

BACKGROUND OF THE INVENTION

This invention relates generally to a slidable room assembly, particularly to a slidable room for a vehicle for a vehicle having a slidable room or compartment that is retracted when the vehicle is in motion and may be extended to afford more room when the vehicle is parked. More particularly, this invention relates to a method of installing a slidable room.

Recreation vehicles including motor homes, fifth wheel trailers and travel trailers may be provided with an extendable slidable unit for increasing the vehicle's living space. This slidable unit may be extended for use when the vehicle is parked and is retracted in a telescoping manner when the vehicle is to be moved.

Existing slidable rooms for vehicles can be time consuming to install. Frequently, the operating mechanisms consist of many separate components that must be individually installed and connected, which incurs significant labor costs.

The foregoing illustrates limitations known to exist in present slidable room assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a slidable room comprising:
  a frame adapted to be attached to a vehicle about an opening in the vehicle, the frame comprising: a header; and sill; and two pre-assembled jambs, each jamb having: a plurality of pulleys thereon; a plurality of cable extension holes therein; and a plurality of cables, a first end of each cable extending around at least one pulley and through one cable extension hole, a second end of the cables extending beyond an end of the jamb;
  a room, the room being adapted to be inserted into the vehicle opening and into the frame;
  the first end of the plurality of cables being attached to the room; and
  a motor, the second end of the cables being operatively attached to the motor.

In another aspect of the present invention, this is accomplished by providing a jamb for attachment to a vehicle and for use with a slidable room adapted to be installed in an opening in the vehicle, the jamb comprising:
  a framing member, the framing member having a plurality of cable extension holes therein, the framing member being adapted for attachment to the vehicle adjacent the vehicle opening;
  a plurality of pulleys rotatably attached to the framing member;
  at least one cable, a first end of the at least one cable extending around at least one pulley and through a cable extension hole, a second end of the at least one cable extending beyond an end of the framing member.

In a further aspect of the invention, this is accomplished by providing a vehicle comprising:
  at least one wall having an opening therein;
  a slidable room frame comprising: two interconnecting frames and two pre-assembled cable frames, each cable frame having: a plurality of pulleys thereon; a plurality of cable extension holes therein; and a plurality of cables, a first end of each cable extending around at least one pulley and through one cable extension hole, a second end of each cable extending beyond an end of the cable frame, the slidable room frame being attached about the opening of the at least one wall;
  a room inserted into the opening of the at least one wall, the room being reciprocable between an extended position and a retracted position, the first end of the plurality of cables being attached to the room; and
  a motor attached to the at least one wall, the second ends of the cables being operatively attached to the motor.

In a preferred embodiment, the cable frames are jambs attached to the sides of the opening and the interconnecting frames are a header and sill positioned at the top and bottom of the opening respectively.

In yet another aspect of the present invention, this is accomplished by providing a frame member for attachment to a vehicle and for use with a slidable room adapted to be installed in the vehicle, the frame member comprising:
  an elongated first member; and
  an elongated wall clamp member,
  the first member and the wall clamp member each having an attachment flange adapted to be attached to the vehicle, the first member and the wall clamp member having complementary longitudinally extending engaging flanges wherein the first member engaging flange retainingly engages the wall clamp member engaging flange.

In yet another aspect of the present invention, this is accomplished by providing a cable adjuster comprising:
  a body; and
  a plurality of threaded adjusters attached to the body, an end of the threaded adjusters being adapted to be connected to a flexible member.

In yet another aspect of the present invention, this is accomplished by providing a method of installing a slidable room in a vehicle, the vehicle having an opening therein, the method comprising the steps of:
  providing a frame, the frame comprising two jambs, a header and a sill, each jamb having:
    a plurality of pulleys thereon; a plurality of cable extension holes therein; and, a plurality of cables, a first end of the cables extending around at least one pulley and through one cable extension hole, a second end of the cables extending beyond an end of the jamb;
  attaching the frame to the vehicle about the opening in the vehicle;
  attaching a motor to the vehicle;
  attaching the cables to the motor;
  inserting the slidable room into the vehicle opening and through the frame; and
  attaching the cables to the slidable room.

The foregoing and other aspects will become apparent from the following detailed description of the invention when considered in conjunction with the accompanying drawing figures.

BRIEF DESCRIPTION OF THE DRAWING FIGURES

FIG. 2 is a perspective interior view of a frame and cable arrangement for the slidable room shown in FIG. 1;

DETAILED DESCRIPTION

Figure 1:
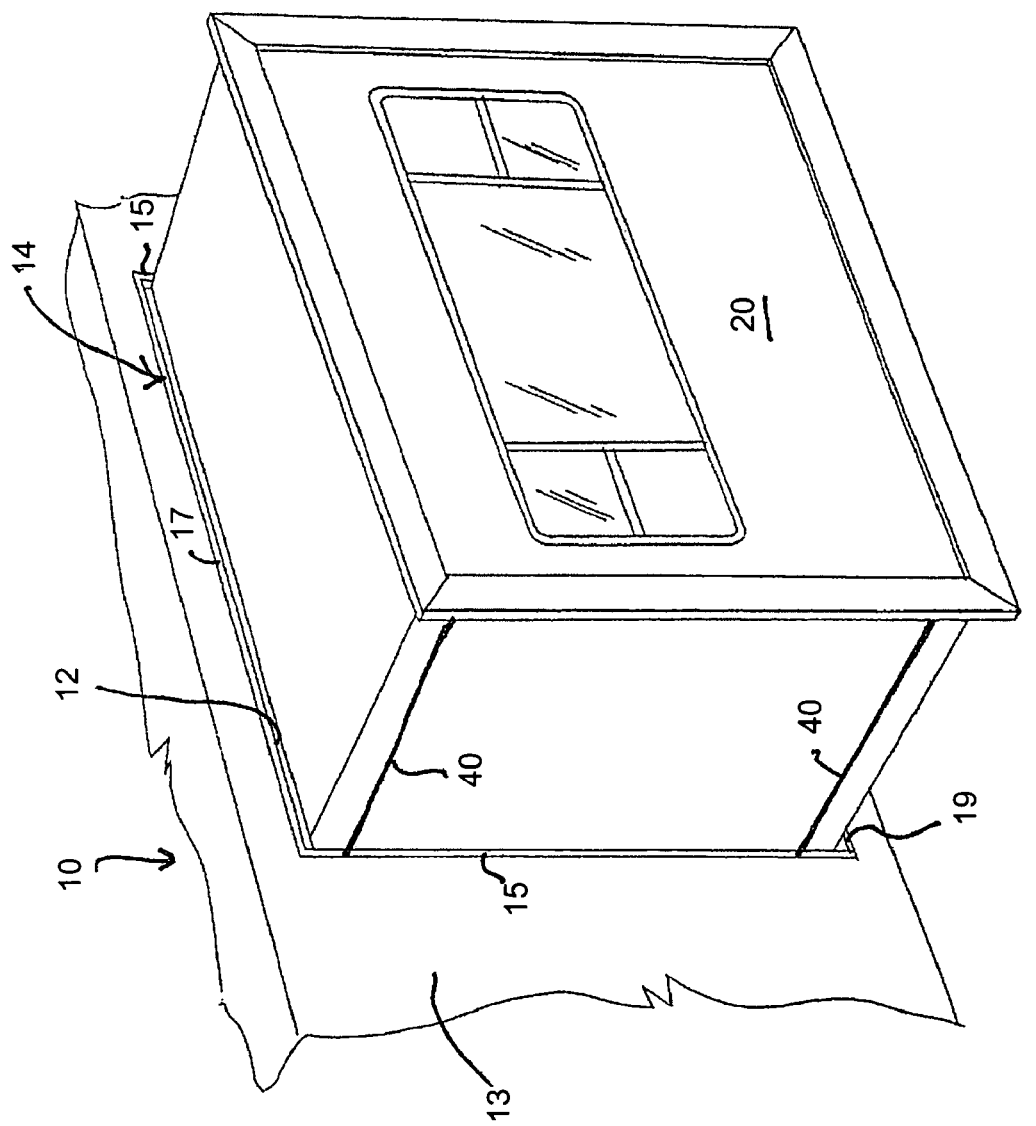
FIG. 1 is a perspective exterior view of a portion of a vehicle having a slidable room according to the present invention, showing the slidable room in a fully extended position.
Figure 2A:
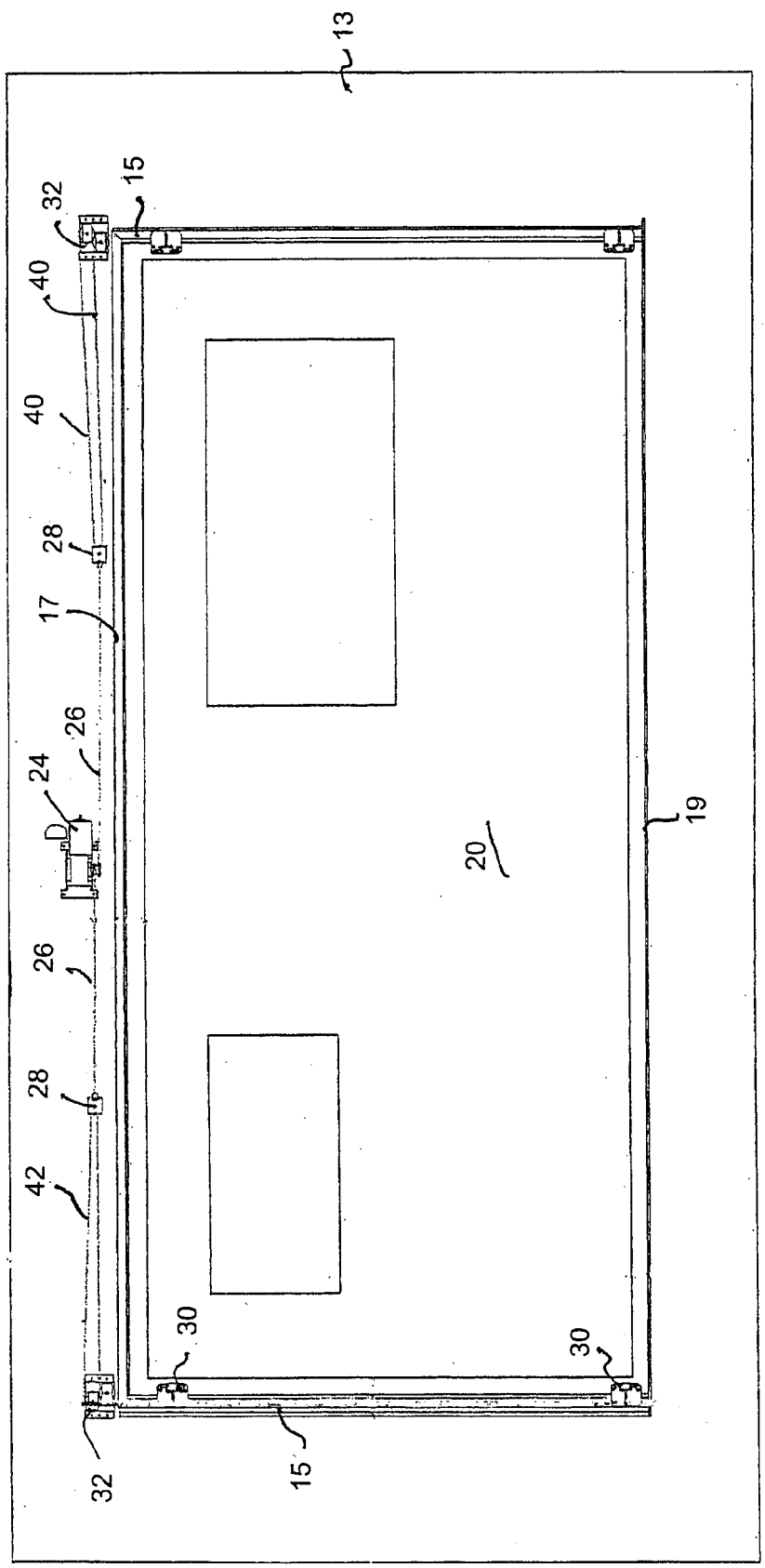
FIG. 2A is a plan inside view of a portion of the vehicle shown in FIG. 1 illustrating the frame, cables and motor components of the present invention.

FIG. 1 shows a portion of a vehicle 10 with a slidable room 20 in an extended position. During movement or transport of the vehicle, the slidable room 20 is normally fully retracted into the vehicle 10. The vehicle wall 13 has an opening 12 into which the slidable room 20 fits. Positioned about the edges of the opening 12 is a frame 14. As shown in FIGS. 2 and 2A, frame 14 consists of two cable frames 15 and two interconnecting frames 17, 19. In the embodiments shown in the figures, the cable frames 15 are jambs and the interconnecting frames are a header 17 and sill 19. Preferably, one or more rollers 16 are attached to sill 19 and room 20 rolls on these rollers 16 when room 20 is extended or retracted. Optionally, seals, such as a polymeric strip, can be provided on the inside of frame 14 to provide a weather tight seal between the frame and the room 20. Room 20 can include a dinette, wardrobe, library, storage, bedroom, closet, kitchen, etc. compartment.

The vehicle 10 may be a self-powered vehicle, such as a recreational vehicle, or may be a trailer that is adapted to be towed, e.g., by an automobile or a truck tractor. The vehicle may be one that is designed for living (as a house trailer), or may be a work vehicle (e.g., a mobile library). The slidable room 20 can also be used with fixed structures such as modular housing or vacation homes.

Figure 3:
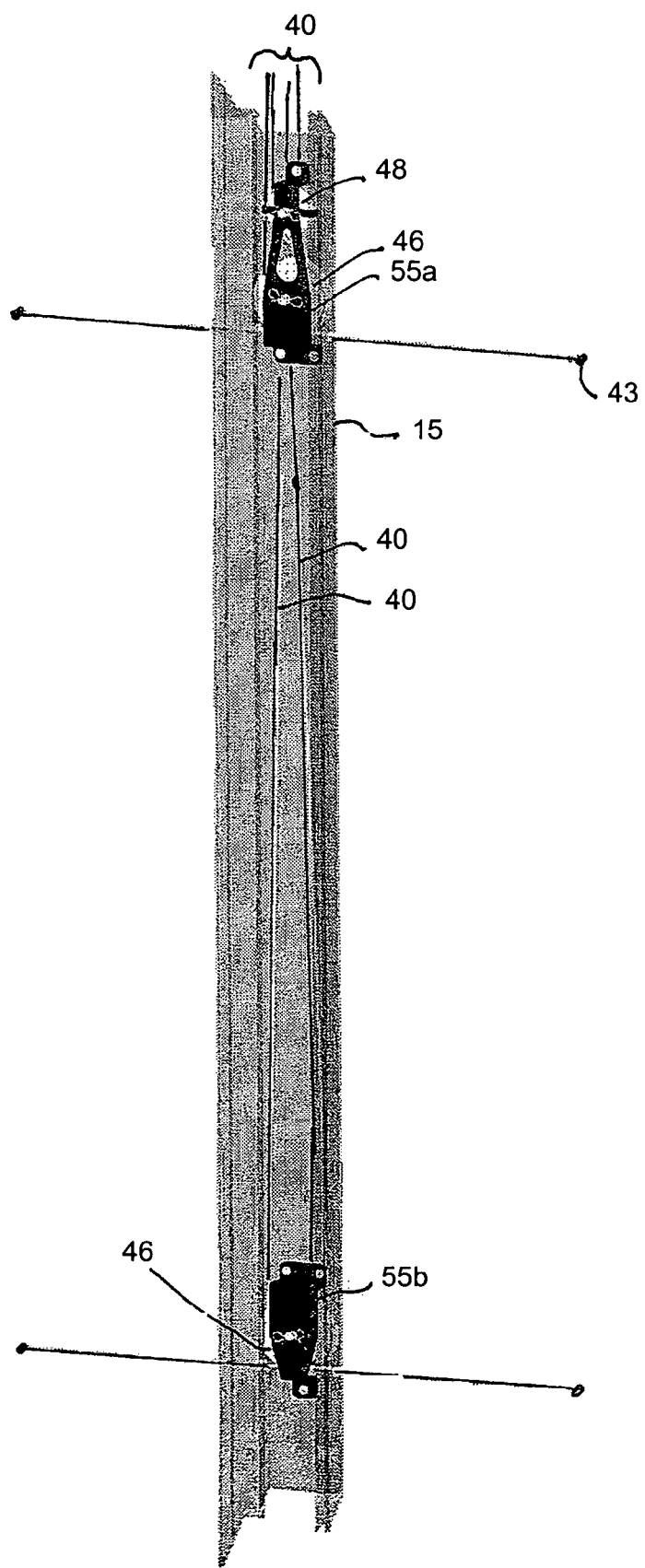
FIG. 3 is a perspective view of the jamb shown in FIG. 2, illustrating the pulleys within the jamb.
Figure 4A:
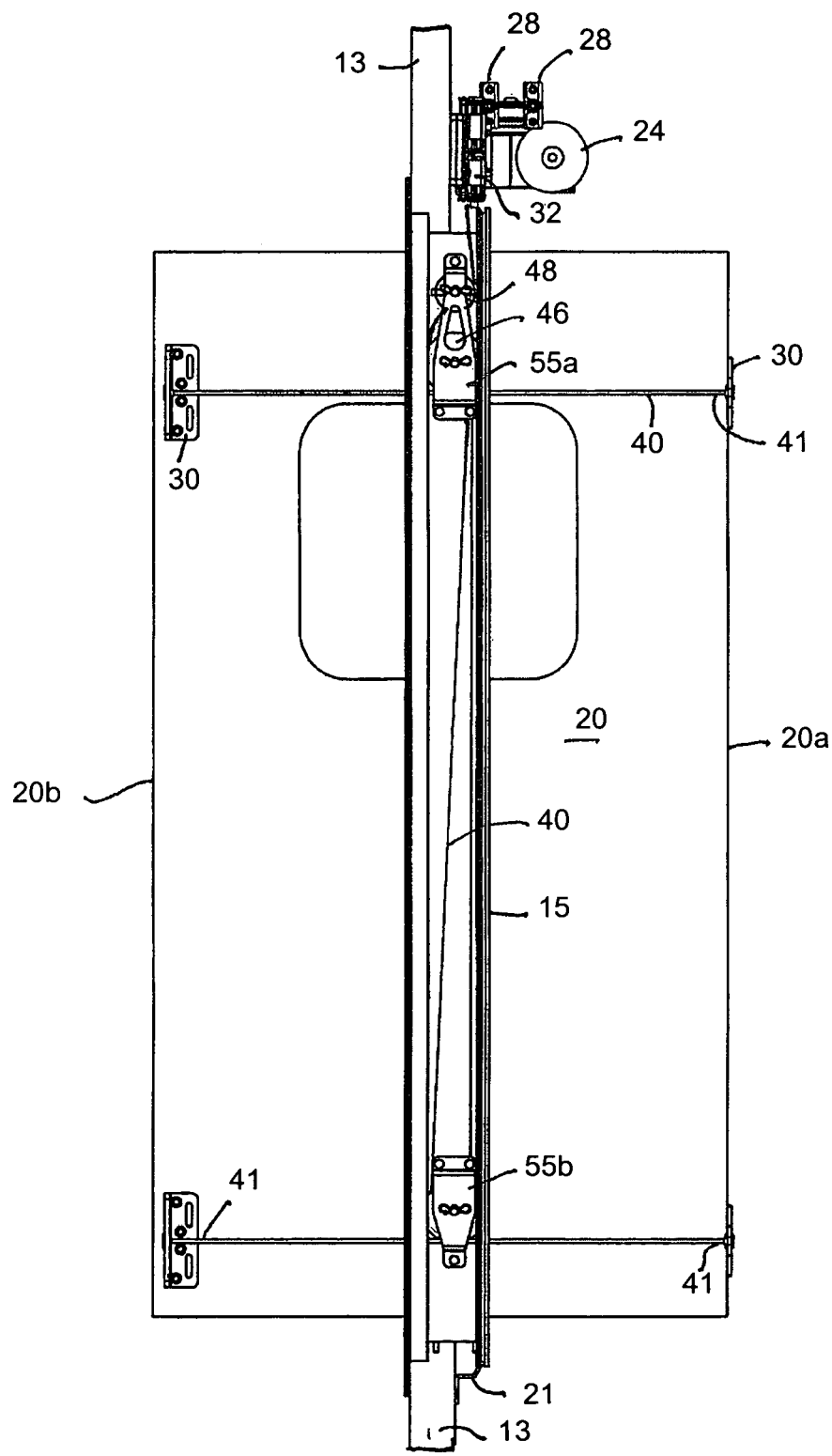
FIG. 4A is a cross-sectional view of the slidable room shown in FIG. 1.

As shown in FIGS. 3 and 4A, each cable frame or jamb 15 is pre-assembled with a plurality of pulleys 46 and a plurality of cables 40 pre-strung around the pulleys 46. One end 41 of each cable 40 extends from a pulley 46 through a cable extension hole 36 in jamb 15. After installation, the cable first ends 41 are attached to room 20 with attachment anchors 30. Preferably, a cable end plug 43 is attached to the cable first ends 41 to prevent the ends of the cables from being pulled through the cable extension holes 36.

The other end or second end 42 of each cable 40 extends from an end of jamb 15. After installation, the cable second ends 42 are attached a drive motor 24. Preferably, each jamb 15 includes four cables 40. The cable second ends 42 are strung through a corner pulley bracket 32, which includes two double pulleys 33. After passing through a corner pulley bracket 32, the cable second ends 42 are attached to a chain 26 by cable chain connectors 28. Chain 26 is then attached to a sprocket 34 on drive motor 24. Each end of chain 26 is attached by a cable chain connector 28 to two cable second ends 42. The cables 40 attached to one end of chain 26 are attached to the outside 20b of room 20 and the cables 40 attached to other end of chain 26 are attached to the inside 20a of room 20. Since frame 14 includes two jambs 15, two chains 26 are attached to sprockets 34 on drive motor 24. Each chain 26 connects to the cables 40 associated with one jamb 15. Therefore, each chain 26 is associated with one side of room 20, either the left side or the right side.

When drive motor 24 is rotated in a first direction, the cables 40 attached to the inside 20a of room 20 are retracted, causing room 20 to be extended out of vehicle 10. When drive motor 24 is rotated in the opposite direction, the cables 40 attached to the outside 20b of room 20 are retracted, causing room 20 to be retracted into vehicle 10.

As shown in FIGS. 3, 4A, 4C, 4D and 5, the preferred embodiment of jamb 15 has two sets of double pulleys 46, a lower set and an upper set. The upper set of double pulleys 46 also includes an idler 48. Pulley support brackets 55a, 55b are riveted to jamb 15. The pulleys 46 and idler 48 are all attached to jamb 15 by clevis pins 56 that fit through holes in jamb 15 and pulley support brackets 55a, 55b. A clip (not shown) fits into a hole in clevis pin 56 to retain clevis pin 56 in the pulley support brackets 55a, 55b.

As shown in FIGS. 3 and 4A, one cable 40 extends from a first cable chain connector 28, through corner pulley bracket 32, around an upper pulley 46, through an upper cable extension hole 36 and is then attached to the outside 20b of room 20. A second cable 40 extends from the first cable chain connector 28, through corner pulley bracket 32, around a lower pulley 46, through a lower cable extension hole 36 and is then attached to the outside 20b of room 20. A third cable 40 extends from a second cable chain connector 28, through corner pulley bracket 32, around idler 48, an upper pulley 46, through an upper cable extension hole 36 and is then attached to the inside 20a of room 20. The fourth cable 40 extends from the second cable chain connector 28, through corner pulley bracket 32, around a lower pulley 46, through a lower cable extension hole 36 and is then attached to the inside 20a of room 20. Since there are two jambs 15, this cable arrangement is repeated for the other side of the room 20.

Although the preferred embodiment shown in the figures shows the cable frames or jambs 15 on the sides of room 20 with the interconnecting frames 17, 19 forming the header 17 and sill 19 of frame 14, the cable frames 15 could be positioned above and below room 20 with the interconnecting frames 17, 19 along the sides of room 20. The motor 24, along with the corner pulley brackets 32, would preferably then be positioned along one of the sides of room 20. It is also possible to use more or less cables in each jamb 15 than the four cables shown in the figures. The second ends 42 of cables 40 could exit the lower end of jamb 15 with corner pulley brackets 32 and motor 24 being mounted below room 20. The first ends 41 of cables could alternatively be attached to the top and bottom of room 20, rather than to the sides of room 20.

Figure 5:
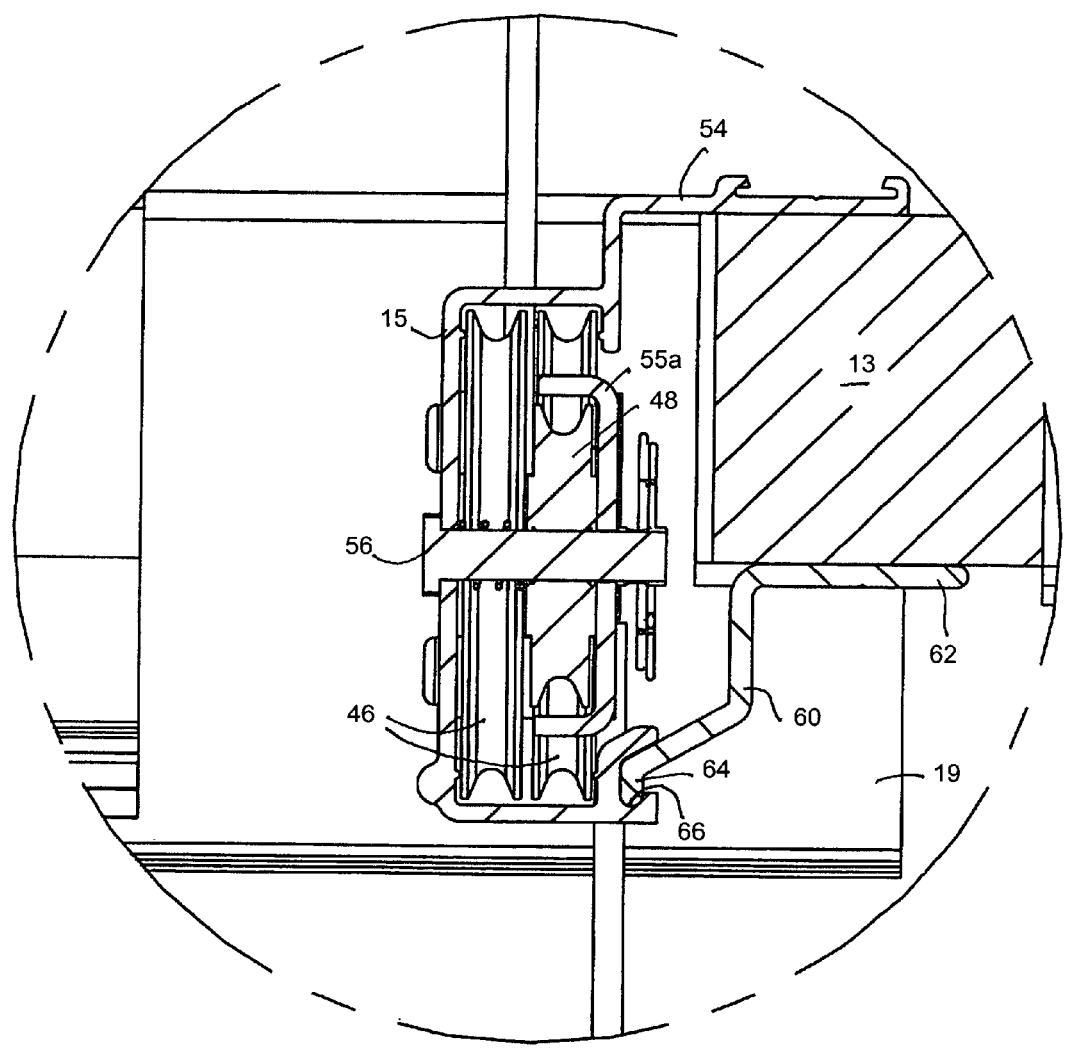
FIG. 5 is an enlarged cross-sectional view of the jamb shown in FIG. 3, illustrating one set of pulleys and the attachment of the jamb to the vehicle wall.

Cable frame or jamb 15 preferably includes a cap or jamb clamp 60 (See FIG. 5). The jamb 15 has an attachment flange 54 that is attached to the outside of vehicle wall 13. The inside portion of jamb 15 has a jamb slot 66 into which the jamb clamp 60 fits. The jamb clamp 60 includes an attachment flange 62 that is parallel to the jamb attachment flange 54 and is attached to the inside of vehicle wall 13. The jamb clamp 60 also has a hook 64 that fits into jamb slot 66. During installation of jamb 15, jamb 15 with the attached pulleys 46 and pre-strung cables 40 is attached to vehicle wall 13 using a plurality of fasteners (not shown). Then the jamb clamp hook 64 is inserted at an angle into the jamb slot 66. Finally, jamb clamp 60 is rotated so that the attachment flange 62 fits against vehicle wall and is attached to the inside of vehicle wall 13 with a plurality of fasteners (not shown). Sill 19 preferably has the same shape as jamb 15. A sill clamp 21, also preferably having the same shape as jamb clamp 60, fits into sill 19. Sill 19 and sill clamp 21 are attached in the same manner as jamb 15 and jamb clamp 60. The jamb clamp 60 adds strength to jamb 15 and reduces flexing of jamb 15.

Figure 4B:
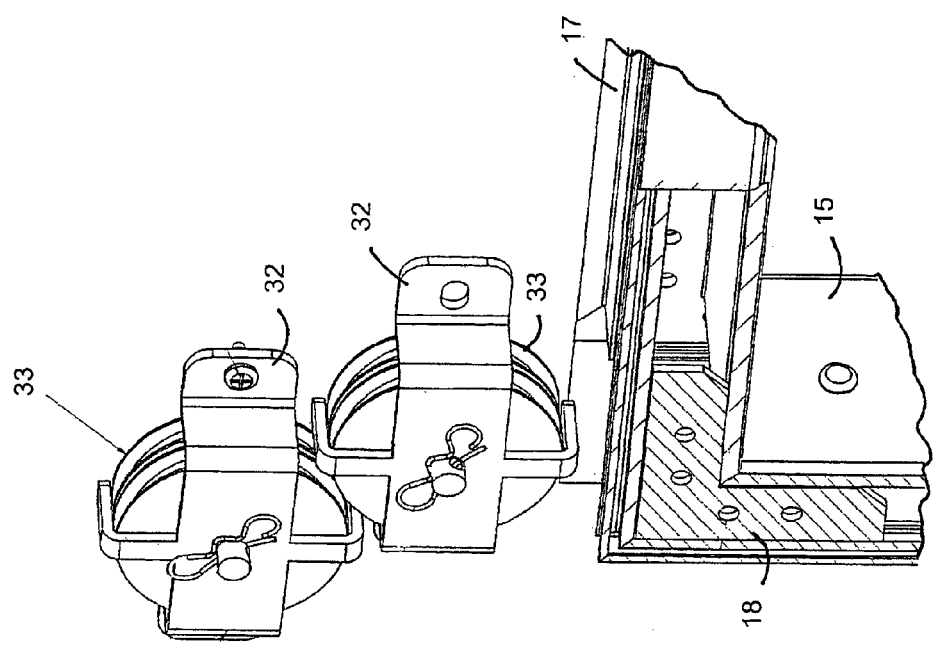
FIG. 4B is an enlarged view of an upper corner of the cable frame shown in FIG. 2A.
Figure 4D:
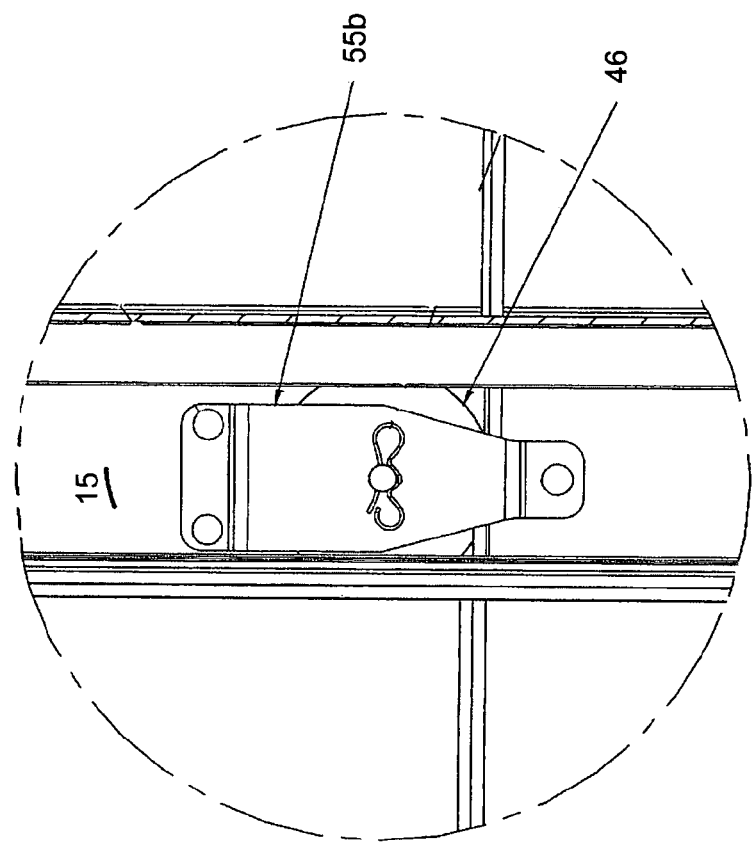
FIG. 4D is an enlarged view of the lower pulley in the jamb shown in FIG. 3.
Figure 4C:
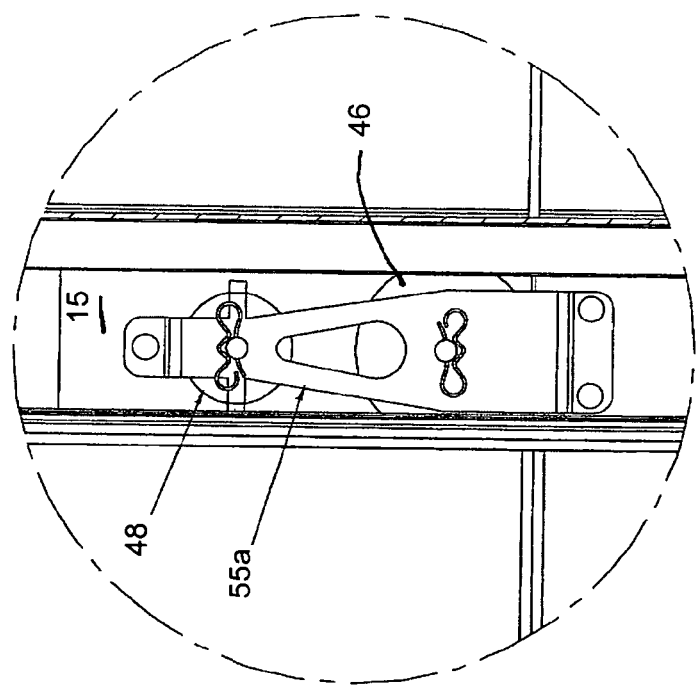
FIG. 4C is an enlarged view of the upper pulley in the jamb shown in FIG. 3.

To install slidable room 20 in opening 12, the basic method starts with an assembled frame 14, which consists of two jambs 15 connected to one another by the interconnection frames 17, 19, normally header 17 and sill 19. A corner connector 18 (see FIG. 4B) fits in each corner of frame 14 and connects one frame member to an adjacent frame member. Cables 40 have been pre-strung through the pulleys 46 attached to jamb 15. The first cable ends 41 extend through cable extension holes 36. The second cable ends 42 extend from one end of jamb 15. The frame 14 is inserted into vehicle 10 through opening 12 and positioned with the jambs 15, header 17 and sill 19 adjacent the edges of opening 12. The header 17 and sill 19 have a shape similar to jamb 15 and have attachment flanges similar to attachment flange 54. The four attachment flanges abut the outside surface of vehicle wall 13. Fasteners (not shown) attach frame 14 to wall 13 via the four attachment flanges. Wall clamp 60 is then engaged with jamb 15 and attached to the inside of wall 13. Sill clamp 21 is attached in the same manner as wall clamp 60.

In an alternate installation method, jambs 15, header 17 and sill 19 are provided as separate pieces. Each piece is individually attached to the vehicle wall 13.

After frame 14 is installed, motor 24 is attached to wall 13, typically above header 17. The corner pulley brackets 32 are attached to vehicle wall 13 and chains 26 are placed on the motor sprockets 34.

Slidable room 20 is inserted into the vehicle 10 through frame 14. Attachment anchors 30 are attached to room 20. The cable first ends 41 are connected to attachment anchors 30. The length of cables 40 are adjusted as necessary using cable chain connectors 28.

Figure 4E:
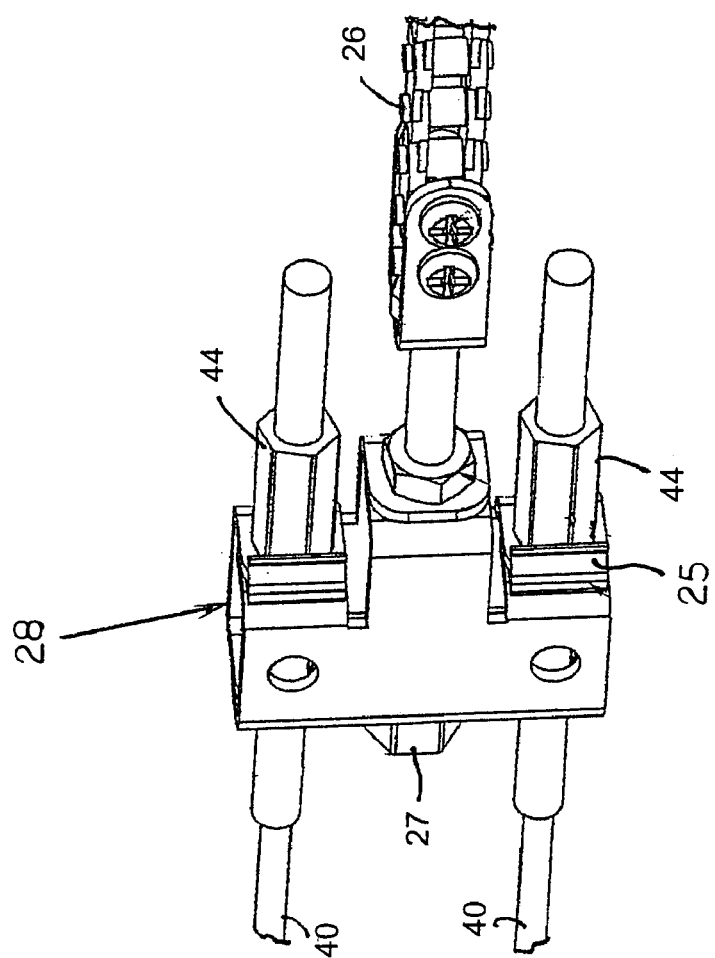
FIG. 4E is an enlarged view of the cable adjuster shown in FIG. 2.

Each cable chain connector 28 is formed from two identical parts nested together as shown in FIG. 4E. Two threaded cable adjusters 44, consisting of a threaded rod and adjustment nut, attach the second ends 42 of two cables 40 to the cable chain connector 28. A threaded chain adjuster 27, consisting of a threaded rod and adjustment nut, attach one end of a chain 26 to the cable chain connector 28. As shown in FIG. 4E, the cables 40 are attached to one side of the cable chain connector 28 and the chain 26 is attached to the opposite side of the cable chain connector 28. Preferably, the cable adjuster 27 is positioned between the two cable adjusters 44.

An anti-vibration clip 25 is provided for each threaded cable adjuster 44. Anti-vibration clip 25 is a spring steel clip having a base portion with a hole therein and a tab extending from the base portion. The threaded cable adjuster extends through the hole and the anti-vibration clip 25 is held in place by the adjustment nut. The tab extends along the side of the adjustment nut and prevents the nut from turning by pressing against one of the flats of the adjustment nut. The anti-vibration clip prevents rotation of the adjustment nut as a result of vibration caused by transport of the recreational vehicle on roads or operation of slidable room 10. Because anti-vibration clip 25 is formed from spring steel, the tab will ratchet out of the way when the adjustment nut is being deliberately turned to adjust a cable.

Figure 6:
FIG. 6 is a plan view of an instruction sheet included with the slidable room shown in FIG. 1.
Figure 7:
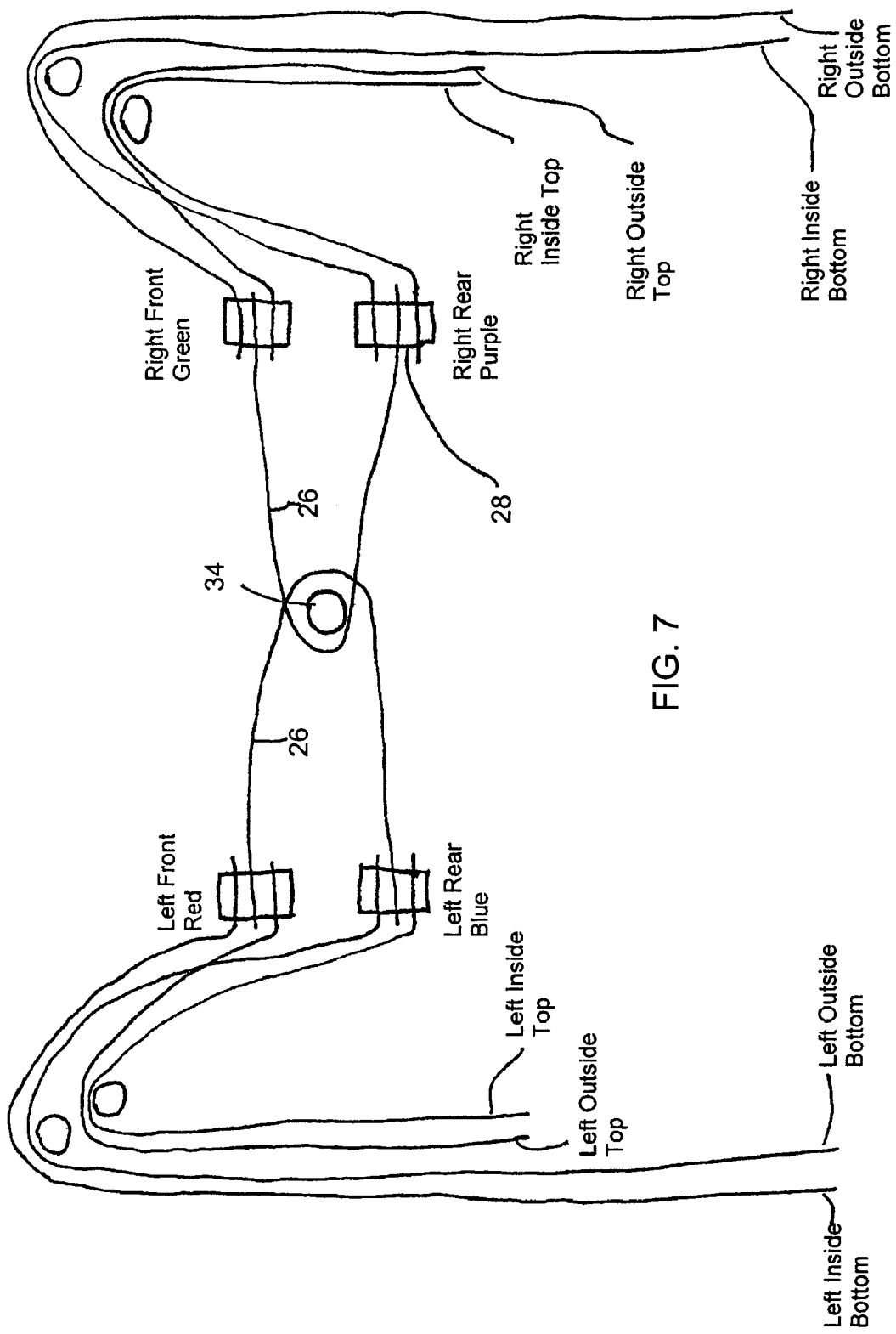
FIG. 7 is a schematic representation of the cables, chains and cable chain connectors shown in the FIGURES.

FIG. 6 shows a cable adjustment instruction template 70 which is used in conjunction with the cable adjusters 44 and the chain adjuster 27 to adjust the overall tension and the tension in individual cables 40 for proper alignment and adjustment of room 20. Typically, template 70 is attached to frame 14 or wall 13 near the cable chain connectors 28. FIG. 7 is a schematic representation of the cable system showing the relationship between the instructions on template 70 and the cable chain connectors 28. Template 70 is divided into four color coded sections, one section for each cable chain connector 28. Each cable chain connector 28 is color coded to match one of the color coded sections of the template 70. For example, the left front cable chain connector 28 is color coded red to correspond with the red section of template 70. The cables 40 attached to left front (red) cable chain connector 28 are adjusted to adjust the tension on cables 40 for the left side of the room 20 when room 20 is in the extended position. The cables 40 attached to the left rear (blue) cable chain connector 28 are adjusted to adjust the tension on cables 40 for the left side of the room 20 when room 20 is in the retracted position. To adjust the overall tension in the left side cables 40 and chain 26, the adjuster nut on chain adjuster 27 on either left cable chain connector 28 is adjusted to either increase or decrease the overall tension. To adjust the tension in the left side cables 40, the adjustor nut on the appropriate cable adjuster 44 is adjusted to either increase or decrease the overall tension. Typically, the cable 40 attached to the upper half of a cable chain connector 28 is connected to a lower or bottom part of room 20 and the cable 40 attached to the lower half of the cable chain connector 28 is connected to the upper or top part of room 20.

Figure 2B:
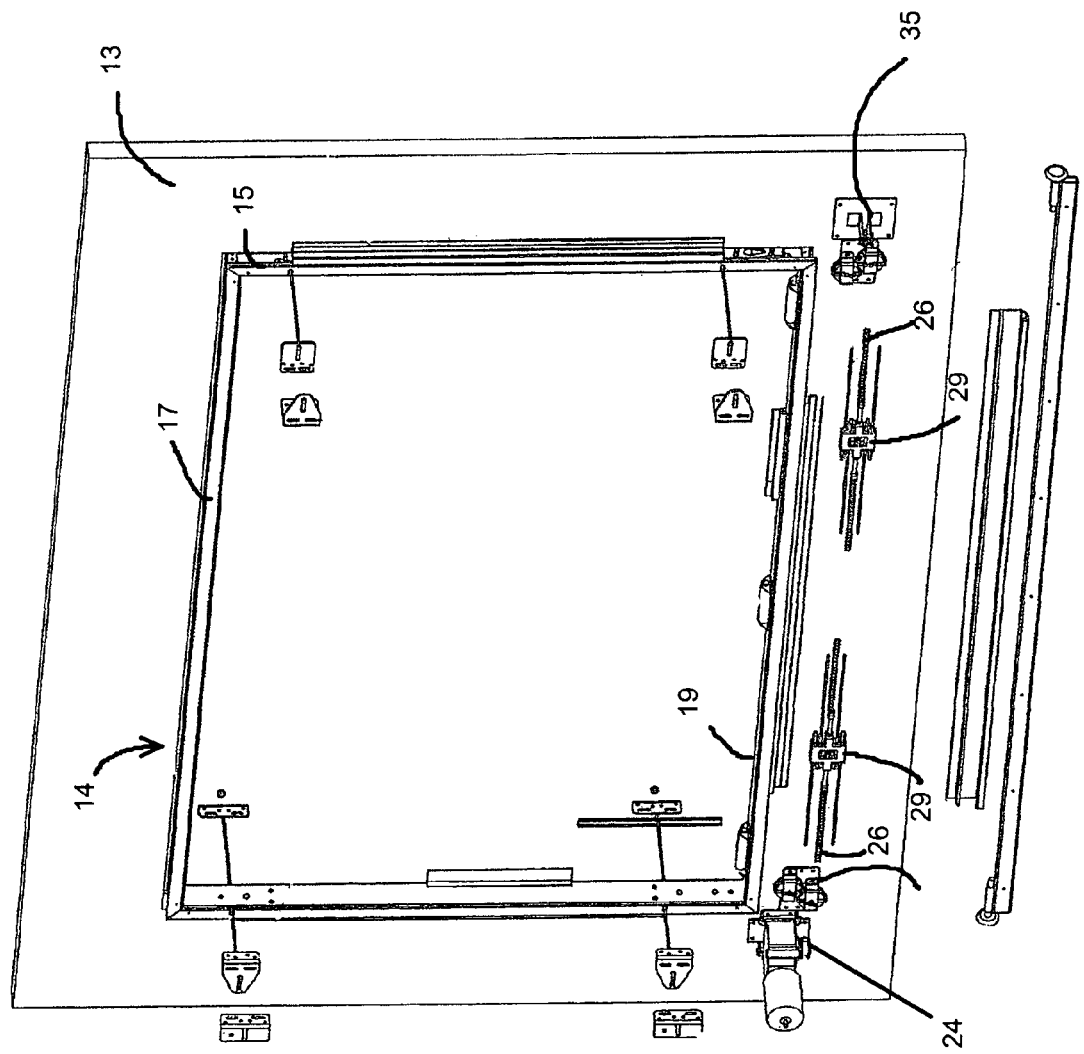
FIG. 2B is a plan inside view of a frame and cable arrangement for a rear extension slidable room.
Figure 2C:
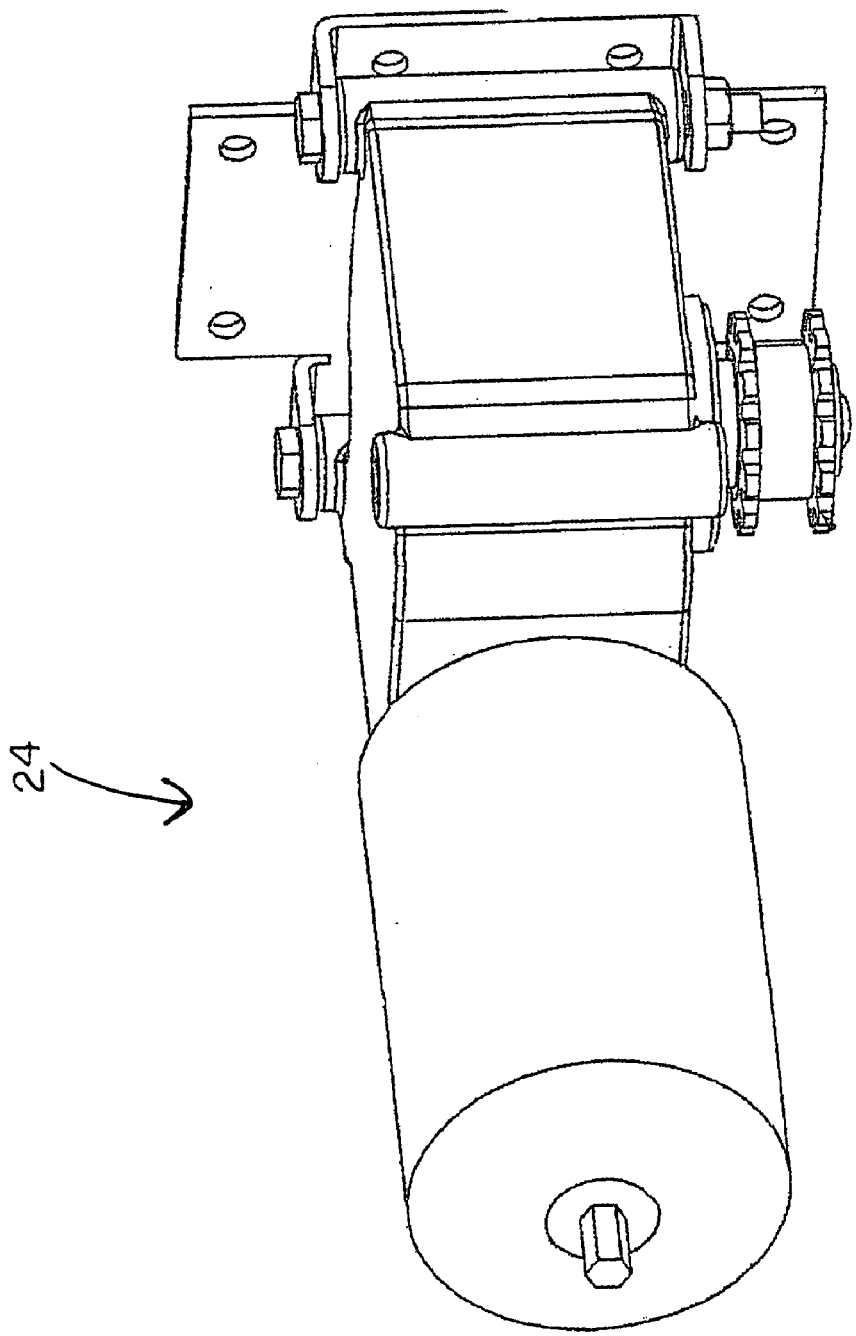
FIG. 2C is an enlarged plan view of drive motor 24.
Figure 2D:
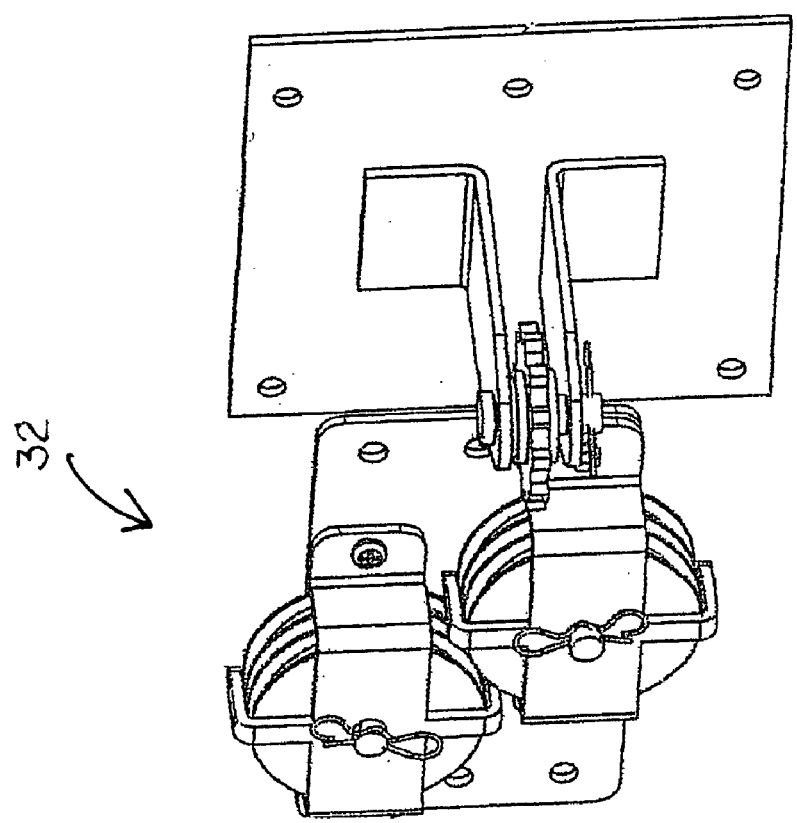
FIG. 2D is a plan view of idler sprocket 32, illustrated in FIG. 2B.
Figure 4F:
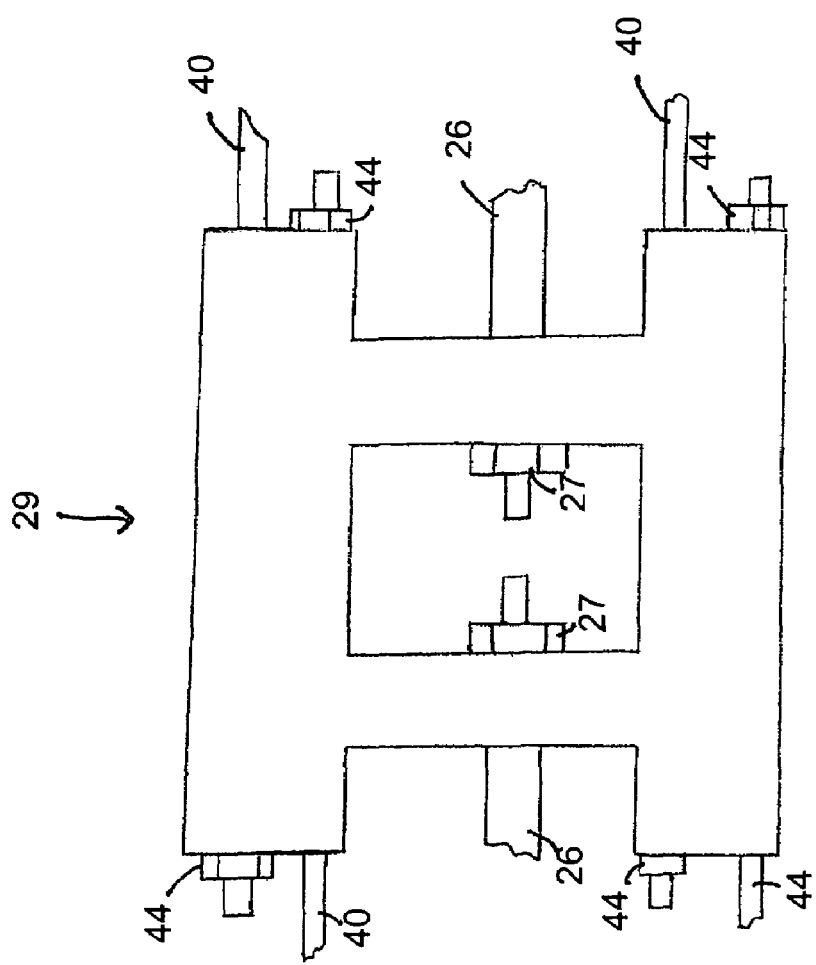
FIG. 4F is an enlarged view of the cable adjuster shown in FIG. 2B.
Figure 4G:
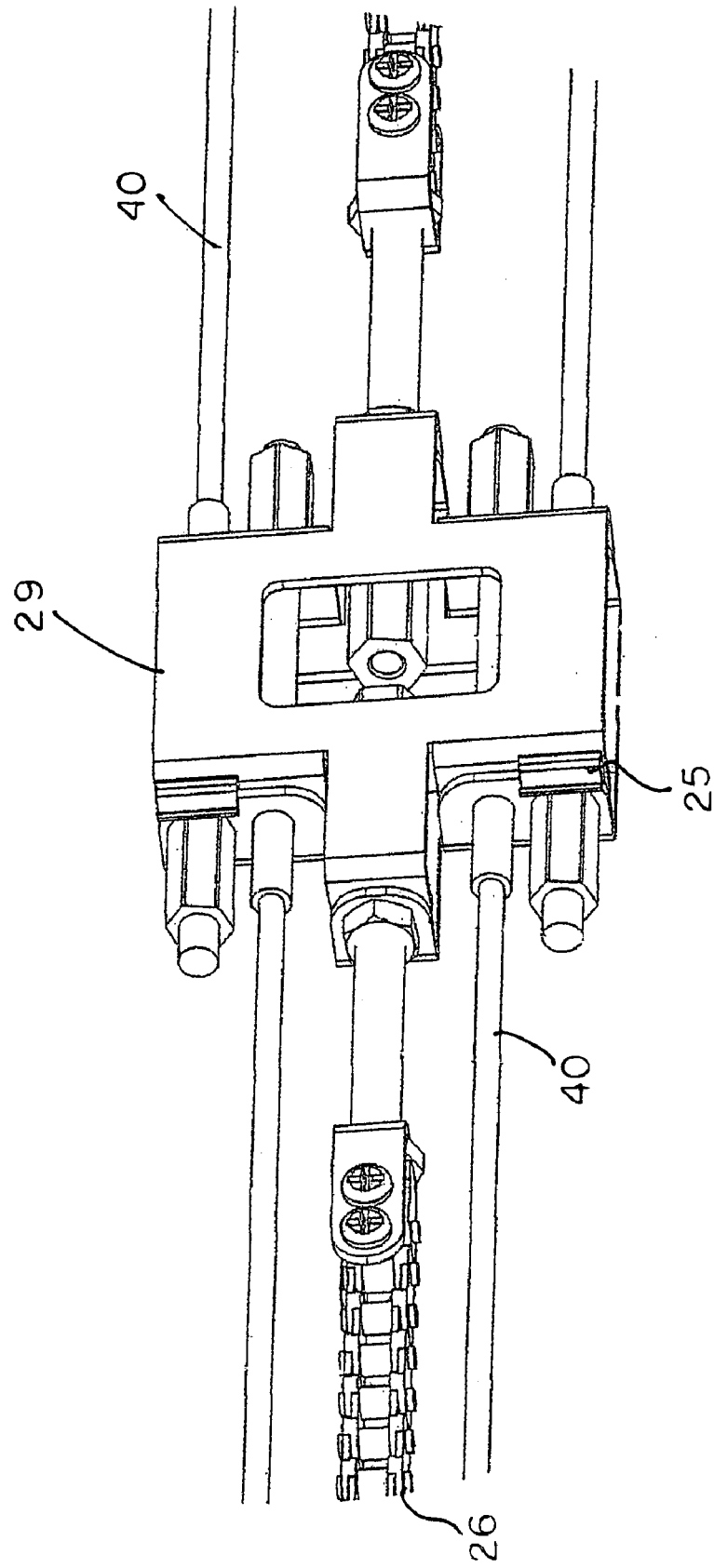
FIG. 4G is a perspective view of the cable adjuster shown in FIG. 2B.

An alternate cable arrangement shown in FIG. 2B is used for slidable rooms that extend outward from the rear of the recreational vehicle 10. One such use of a rear extension slidable room is for a bedroom containing a bed. In this arrangement, motor 24 is mounted below and to one side of frame 14. In place of the four cable chain connectors 28, two cable chain connectors 29 are used to connect four cables 40 to both chains 26, see FIG. 4F. One chain 26 is connected to each cable chain connector 29 and fits about sprocket 34 on the motor 24. The other chain 26 is connected to each cable chain connector 29 and fits about an idler sprocket 35, which is positioned below the frame 14 and on the opposite side of the frame 14 from the motor 24. The cables 40 pass around the respective corner pulleys 32 and enter the bottom of jamb 15, which is upside down compared to the jamb 15 shown in FIG. 2. Therefore, the idler pulley 48 that is at the upper part of jamb 15 in FIG. 2 is at the lower part of jamb 15 in FIG. 2B. Cables 40 pass around double pulleys 48 and out through cable extension holes 36 in the same manner as described for jamb 15 above.

The cables 40 and chains 26 are connected to the cable chain connector 29 in the same manner as shown in FIG. 4E and discussed above to allow adjustment of the tension in the cables and chains and to adjust the alignment of the room. Cable chain connector 29 is also formed from two identical parts nested together.

The chains 26 and cable chain connectors 29 are connected in an endless loop. The motor chain 26 extends from the motor 24 to a first connector 29. The idler chain 26 extends from the first connector 29 around the idler sprocket 35 and to the second connector 29. The other end of the motor chain 26 is connected to the second connector 29 and extends around the motor sprocket 34 completing the endless loop.

The first connector 29 is connected to cables 40 connecting to the left outside of the room and to cables 40 connecting to the right inside of the room. The second connector 29 is connected to cables 40 connecting to the left inside of the room and to cables 40 connecting to the right outside of the room. When the motor 24 is rotated clockwise, the first connector 29 is pulled to the left and the second connector 29 is pulled to the right pulling on cables 40 connected to the inside of the room and allowing the cables 40 connected to the outside of the room to extend out from jamb 15, thereby pulling the room from the retracted position to the extended position. When motor 24 is rotated counterclockwise, the first connector 29 is pulled to the right and the second connector is pulled to the left pulling on cables 40 connected to the outside of the room, thereby pulling the room from the extended position to the retracted position.

Figure 8:
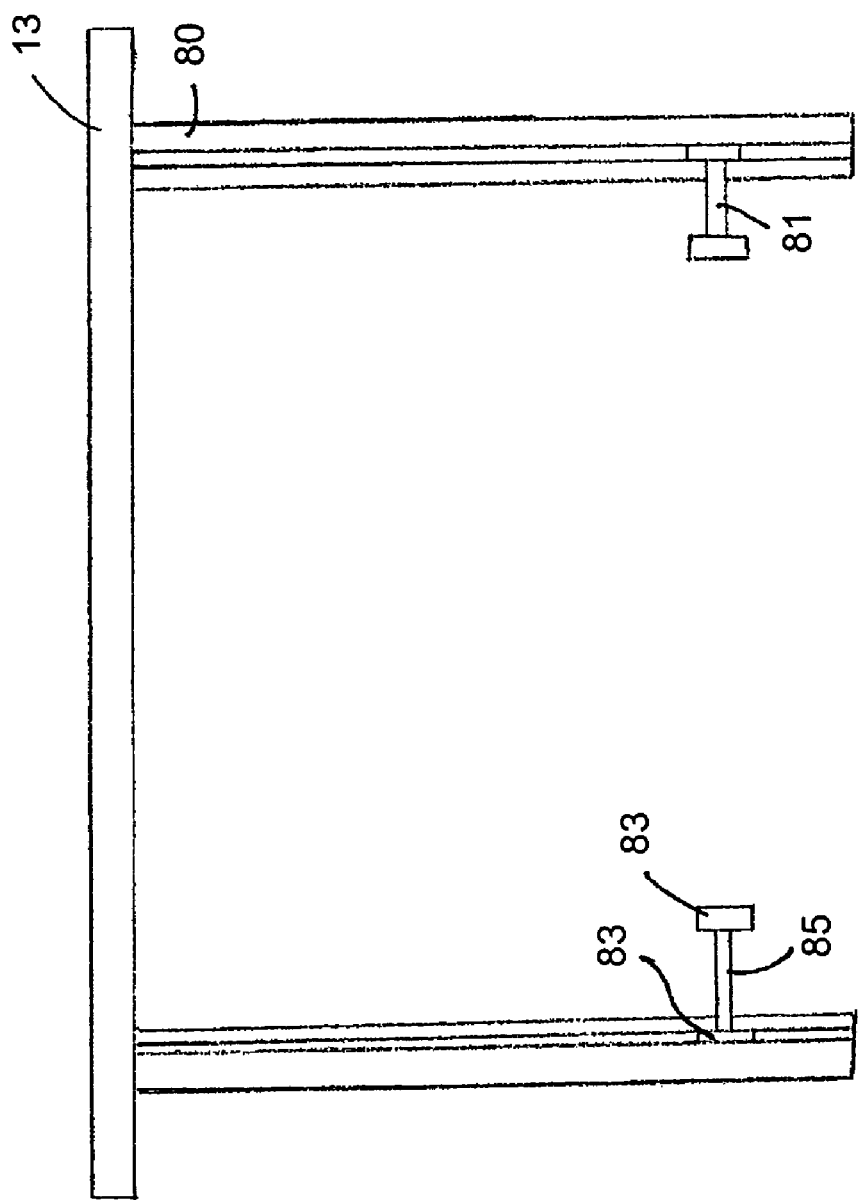
FIG. 8 is a plan view of track and roller for use with a slidable room.
Figure 9:
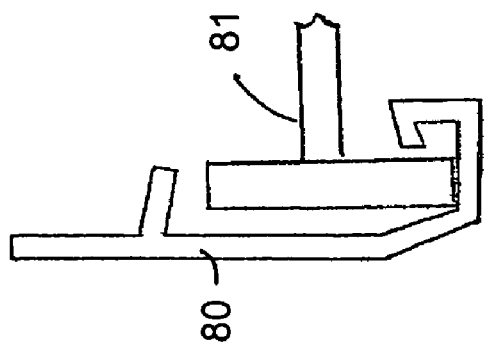
FIG. 9 is an end view of the track and roller shown in FIG. 8.

FIGS. 8 and 9 show a track 80 and roller 81 for use with the room 20. This track 80 and roller 81 are preferably used with a rear slide system as shown in FIG. 2B. Two tracks 80 are attached to a floor of the recreational vehicle 10 and extend away from the wall 13 through which room 20 extends. Roller 81 consists of two wheels 83 connected by a shaft 85. Preferably, wheels 83 include a bearing (not shown). One wheel 83 hooks into track 80, as shown in FIG. 9, the second wheel 83 rides on the floor of the recreational vehicle 10. Slidable room 20 rolls on top of the second wheel 83.

Having described the invention, what is claimed is:

1. A slidable room comprising:
   a frame adapted to be attached to a vehicle about an opening in the vehicle, the frame comprising:
      two pre-assembled jambs, each jamb having: a plurality of pulleys thereon; a plurality of cable extension holes therein; and a plurality of cables, a first end of each cable extending around at least one pulley and through one cable extension hole, a second end of each cable extending beyond an end of the jamb;
      a header connected to the jambs; and
      a sill connected to the jambs;
   a room, the room being adapted to be inserted into the vehicle opening and into the frame, the first end of the plurality of cables being attached to the room; and
   a motor, the second end of the cables being operatively attached to the motor.

2. The slidable room according to claim 1, wherein each jamb comprises an outside jamb member and a wall clamp member, the outside jamb member and the wall clamp member having attachment flanges adapted to be attached to the vehicle.

3. The slidable room according to claim 1, wherein each jamb comprises an outside jamb member and a wall clamp member, the outside jamb member and the wall clamp member having complementary engaging flanges, wherein the outside jamb member engaging flange retainingly engages the wall clamp member engaging flange.

4. The slidable room according to claim 3, wherein the outside jamb member and the wall clamp member each have an attachment flange adapted to be attached to the vehicle, the wall clamp member attachment flange extending away from the wall clamp member engaging flange, being spaced from, and extending parallel to the outside jamb member attachment flange.

5. The slidable room according to claim 1, further comprising:
   two chains; and
   four cable chain brackets, a plurality of cable second ends and one chain being attached to each cable chain bracket, the chains being attached to sprockets on the motor.

6. The slidable room according to claim 1, further comprising:
   two chains;
   two cable chain brackets, a plurality of cable second ends being connected to each cable chain bracket and one end of each chain being connected to each cable chain bracket; and
   an idler sprocket, the cable chain brackets being positioned between the motor and the idler sprocket,
   one chain being attached to a sprocket on the motor, the other chain being attached to the idler sprocket.

7. The slidable room according to claim 6, wherein four cable second ends are connected to each cable chain bracket, two of the attached cables being connected to a left side of the room and two of the attached cables being connected to a right side of the room.

8. The slidable room according to claim 6, wherein the motor is positioned outboard of one side of the room and the idler sprocket is positioned outboard of the opposite side of the room.

9. The slidable room according to claim 1, further comprising an attachment anchor attached to the first end of each cable.

10. The slidable room according to claim 1, wherein the plurality of pulleys comprises a plurality of spaced apart double pulleys.

11. The slidable room according to claim 1, further comprising an end plug to the cable first ends, the end plugs being larger than the cable extension holes and preventing the cable first end from passing through the cable extension hole.

12. The slidable room according to claim 1, further comprising a corner connector at each corner of the frame, each corner connector being attached to one jamb and one of the header and the sill.

13. The slidable room according to claim 1, further comprising:
   at least one track; and
   at least one roller movably engaging the track, the room being positioned on the at least one roller.

14. The slidable room according to claim 13, wherein each roller comprises two rotatable wheels connected by an axle, one wheel engaging the track, the room being positioned on the other wheel.

15. The slidable room according to claim 13, wherein there are two tracks and at least two rollers.

16. A vehicle comprising:
at least one wall having an opening therein;
a pre-assembled slidable room frame comprising: two interconnecting frames and two pre-assembled cable frames, each cable frame having: a plurality of pulleys thereon; a plurality of cable extension holes therein; and a plurality of cables, a first end of each cable extending around at least one pulley and through one cable extension hole, a second end of each cable extending beyond an end of the cable frame, the slidable room frame being attached about the opening of the at least one wall;
a room inserted into the opening of the at least one wall, the room being reciprocable between an extended position and a retracted position, the first end of the plurality of cables being attached to the room; and
a motor attached to the at least one wall, the second ends of the cables being operatively attached to the motor.

17. The vehicle according to claim 16, wherein each cable frame comprises an outside jamb member and a wall clamp member, the outside jamb member and the wall clamp member being attached to the at least one wall.

18. The vehicle according to claim 17, wherein the outside jamb member and the wall clamp member have complementary engaging flanges, the outside jamb member engaging flange retainingly engaging the wall clamp member engaging flange.

19. The vehicle according to claim 18, wherein the outside jamb member and the wall clamp member each have an attachment flange attached to the vehicle, the wall clamp member attachment flange extending away from the wall clamp member engaging flange, being spaced from, and extending parallel to the outside jamb member attachment flange.

20. The vehicle according to claim 17, wherein the outside jamb member and the wall clamp member each have an attachment flange attached to the vehicle, the attachment flanges being parallel to one another and spaced from one another.

21. The vehicle according to claim 16, wherein the plurality of cables in each cable frame comprises four cables,
two of the cable first ends being vertically spaced from the other two of the cable first ends; and
two of the cable first ends being attached to an outer portion of the room; and the other two of the cable first ends being attached to an inner portion of the room.

22. The vehicle according to claim 16, further comprising:
two chains; and
four cable chain brackets, a plurality of cable second ends and an end of each chain being attached to each cable chain bracket, each chain being attached to a sprocket on the motor.

23. The vehicle according to claim 16, further comprising:
two chains;
two cable chain brackets, a plurality of cable second ends being connected to each cable chain bracket and one end of each chain being connected to each cable chain bracket; and
an idler sprocket, the cable chain brackets being positioned between the motor and the idler sprocket, one chain being attached to a sprocket on the motor, the other chain being attached to the idler sprocket.

24. The vehicle according to claim 23, wherein four cable second ends are connected to each cable chain bracket, two of the attached cables being connected to a left side of the room and two of the attached cables being connected to a right side of the room.

25. The vehicle according to claim 23, wherein the motor is positioned outboard of one side of the room and the idler sprocket is positioned outboard of the opposite side of the room.

26. The vehicle according to claim 16, wherein each cable frame is attached adjacent a vertical edge of the opening and each interconnecting frame is attached adjacent to a horizontal edge of the vehicle opening.

27. The vehicle according to claim 16, further comprising:
at least one track; and
at least one roller movably engaging the track, the room being positioned on the at least one roller.

28. The vehicle according to claim 27, wherein each roller comprises two rotatable wheels connected by an axle, one wheel engaging the track, the room being positioned on the other wheel.

29. The vehicle according to claim 27, wherein there are two tracks and at least two rollers.

30. A slidable room comprising:
a room movable between an extended position and a retracted position;
a drive mechanism for moving the room between the extended position and the retracted position, the drive mechanism comprising:
a motor having two drive sprockets;
two chains, each chain having two ends, each chain engaging one drive sprocket;
eight cables, each cable having a first end and a second end, each cable first end being attached to the room; and
four cable adjusters, each cable adjuster including three threaded adjusters, a first threaded adjuster being attached to one chain end, second and third threaded adjusters being attached to cable second ends.

31. The slidable room according to claim 30, wherein each cable adjuster has three threaded adjusters.

32. The slidable room according to claim 30, wherein each cable adjuster has six threaded adjusters.

33. The slidable room according to claim 30, wherein:
one cable adjuster is a left inside cable adjuster, one cable adjuster is a right inside cable adjuster, one cable adjuster is a left outside cable adjuster, and one cable adjuster is a right outside cable adjuster,
one of the two cables attached to each cable adjuster is attached to a lower portion of the room, the other of the two cables attached to each cable adjuster is attached to an upper portion of the room.

34. The slidable room according to claim 33, wherein adjustment of the first threaded adjuster adjusts tension in the chain and cables for one of a left side of the room and a right side of the room.

35. The slidable room according to claim 33, wherein adjustment of the second threaded adjuster adjusts alignment of a lower portion of the room, and adjustment of the third threaded adjuster adjusts alignment of an upper portion of the room.

36. The slidable room according to claim 30, wherein there are two cable adjusters, two chains and four cables being connected to each cable adjuster.

37. The slidable room according to claim 30, further comprising:
   each cable adjuster having identifying indicia thereon,
   a cable adjustment instruction template having cable adjuster indicia thereon, the template cable adjuster indicia corresponding to the cable adjuster identifying indicia, the template further including adjustment instruction indicia for each cable adjuster indicia.

* * * * *